US 6,679,297 B1

(12) United States Patent
Nishi et al.

(10) Patent No.: US 6,679,297 B1
(45) Date of Patent: Jan. 20, 2004

(54) HOSE FOR FUEL TRANSPORTATION

(75) Inventors: Eiichi Nishi, Kanagawa (JP); Toru Sasaki, Kanagawa (JP); Masako Nagashima, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/890,931

(22) PCT Filed: Feb. 4, 2000

(86) PCT No.: PCT/JP00/00625
§ 371 (c)(1),
(2), (4) Date: Aug. 6, 2001

(87) PCT Pub. No.: WO00/46536
PCT Pub. Date: Aug. 10, 2000

(30) Foreign Application Priority Data

Feb. 5, 1999 (JP) .......................... 11-028294
Oct. 28, 1999 (JP) .......................... 11-307555

(51) Int. Cl.$^7$ ............................... F16L 11/00
(52) U.S. Cl. ....................... 138/137; 138/141
(58) Field of Search .................. 138/137, 141, 138/125, DIG. 3, 121; 428/36.91

(56) References Cited

U.S. PATENT DOCUMENTS

| 4,549,921 A | * | 10/1985 | Wolfe, Jr. ............... 156/272.6 |
| 5,284,184 A | * | 2/1994 | Noone et al. ............. 138/121 |
| 5,305,799 A | * | 4/1994 | Dal Palu ................. 138/121 |
| 5,524,673 A | * | 6/1996 | Noone et al. ............. 138/137 |
| 5,566,720 A | * | 10/1996 | Cheney et al. ............ 138/137 |
| 5,613,524 A | | 3/1997 | Martucci |
| 5,704,401 A | * | 1/1998 | Fukui et al. .............. 138/121 |
| 5,718,957 A | * | 2/1998 | Yokoe et al. ............. 428/36.91 |
| 5,792,532 A | * | 8/1998 | Pfleger .................. 428/36.91 |
| 5,885,494 A | * | 3/1999 | Venkataraman et al. ... 264/46.5 |
| 6,024,133 A | * | 2/2000 | Kodama et al. ........... 138/126 |
| 6,090,459 A | * | 7/2000 | Jadamus et al. ......... 428/36.91 |
| 6,165,575 A | * | 12/2000 | Nishi et al. .............. 428/36.9 |
| 6,255,380 B1 | * | 7/2001 | Oki et al. ................ 524/520 |
| 6,261,657 B1 | * | 7/2001 | Ainsworth et al. ........ 138/141 |
| 6,321,794 B1 | * | 11/2001 | Ishida et al. ............. 138/121 |
| 6,604,551 B2 | * | 8/2003 | Nishi et al. .............. 138/137 |

FOREIGN PATENT DOCUMENTS

| JP | 4-25690 | 1/1992 |
| JP | 6-341575 | 12/1994 |
| JP | 8-261374 | 10/1996 |
| JP | 9-196247 | 7/1997 |
| JP | 9-229244 | 9/1997 |
| JP | 10-227267 | 8/1998 |

* cited by examiner

Primary Examiner—James Hook
(74) Attorney, Agent, or Firm—Oblon, Spivak, McClelland, Maier & Neustadt, P.C.

(57) ABSTRACT

A hose for fuel transportation including an inner layer which is a fluororesin layer having electrical conductivity, and an outer layer which is a fluororesin layer having no electrical conductivity, wherein the fluororesin layer in the inner layer includes a material having electrical conductivity, and the material having electrical conductivity comprises a metallized inorganic compound having a surface portion including one of zinc oxide, glass beads and titanium oxide.

12 Claims, 1 Drawing Sheet

HOSE FOR FUEL TRANSPORTATION

TECHNICAL FIELD

The present invention relates to a laminated hose for fuel transportation (hereinafter sometimes referred to simply as a fuel hose) made of a fluororesin laminate excellent in heat resistance, antistatic properties and fuel impermeability. More specifically, it relates to a fuel hose wherein an inner layer and an outer layer are both made of a fluororesin.

Further, the present invention relates to a fuel hose which has a corrugated region midway and thus is capable of warping, shrinking or twisting, whereby it can be mounted in an engine room of an automobile without being subjected to bend processing.

BACKGROUND ART

Fluororesins such as ethylene/tetrafluoroethylene copolymers (hereinafter referred to also as ETFE), tetrafluoroethylene/hexafluoropropylene copolymers (hereinafter referred to also as FEP) or vinylidene fluoride polymers (hereinafter referred to also as PVdF), are excellent in chemical resistance, weather resistance and surface properties and thus are used in a wide range of fields. For example, films of such fluororesins are used as surface coating materials for substrates made of an inorganic material such as metal or glass or made of an organic material such as a synthetic resin. Further, a laminate of a fluororesin sheet and a sheet of other base material, is used for e.g. a hose for fuel transportation for automobiles, or a hose for transportation of an industrial reagent, which requires chemical resistance, and the fluororesin layer is employed usually as a barrier layer to prevent permeation of the fuel component to be transported, as the inner layer.

Usually, the fuel hose has a multilayer structure wherein the barrier layer to prevent permeation of the fuel component to be transported, as the inner layer, is a fluororesin, and an outer layer of polyamide 6, polyamide 11, polyamide 12, etc., is laminated thereon via an adhesive layer. However, as recycling is desired as an attempt to preserve the global environment, a component having such a multilayered structure has a problem that recycling tends to be very difficult.

In addition, the fluororesin has high insulating properties, and when such a fluororesin is used as an inner layer, charges are likely to be built up especially during the passage of liquid and gas fuels, whereby there will be a possible danger of inflammation or explosion by electric discharge. Accordingly, antistatic treatment of the fluororesin is required.

Further, with a view to preservation of the global environment, it has been required in recent years to clean a combustion exhaust gas such as $CO_2$, $NO_x$, $SO_x$, etc., discharged from a mobile source such as an automobile, or to suppress the discharge of such exhaust gas. At the same time, a strict total amount control of exhaust gas is enforced including prevention of leakage into atmospheric air by diffusion of e.g. volatile fuel hydrocarbons through a fuel transportation hose wall of a fuel piping system and a gas discharge system. However, in order to cope with deterioration of the environment on a worldwide scale, even stricter regulations are being considered, and according to observations by the present inventors, it is imperative that in near future, the leakage amount of volatile hydrocarbons from a fuel hose wall will be required to be substantially lower than the measurable limit.

Heretofore, fuel hoses having various material constitutions have been proposed as fuel hoses having the fuel barrier properties improved to be used for fuel piping systems and gas exhaust systems for automobiles, but they can hardly be regarded to be sufficient to meet such strict regulations whereby it is required to reduce the amount of permeation/leakage of hydrocarbons substantially to the limit, as mentioned above.

Namely, the amount of leakage of hydrocarbons per vehicle will be regulated stricter from current at most 2 g/day to at most 0.2 g/day. In such a case, the amount of leakage of hydrocarbons per the outer surface of the hose will be required to be at most 0.01 g/m$^2$·day, preferably at most 0.001 g/m$^2$·day (substantially at most the detectable limit) in the line of the fuel transportation hose i.e. the unit portions provided with connectors for connection at both ends to lead the fuel from the fuel tank to an injector of an engine.

Further, conventional fuel hoses can not be said to have an adequate performance for prevention of leakage of fuel hydrocarbons at a region where the environmental atmospheric temperature is high, such as an engine.

Further, a fuel hose is subjected to bending at various angles over the entire length of a straight tube prepared by extrusion molding, in order to meet the positioning or special restrictions by a specific structure of each automobile. The bending of a hose not only brings about an increase of a process step but also brings about possible formation of creases. If creases are formed, a stress will be concentrated at the regions, whereby there will be a problem that the useful life of the hose tends to be substantially shortened.

DISCLOSURE OF THE INVENTION

Figure 1:
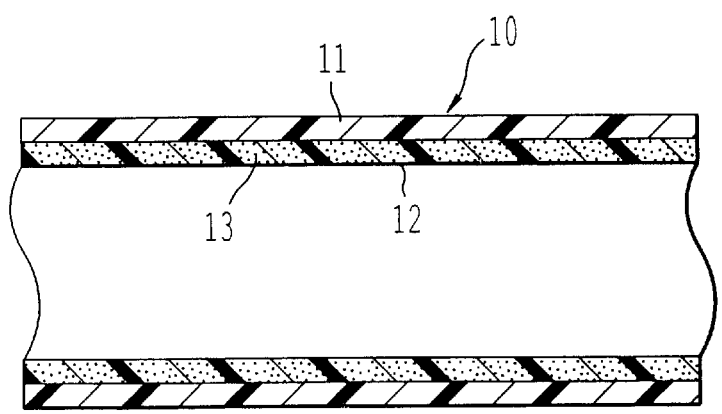
FIG. 1 exemplifies a hose according to the present invention.

The object of the present invention is to provide a fuel hose which prevents permeation of volatile hydrocarbons of a fuel to the limit, has excellent antistatic properties and excellent heat resistance and can be used satisfactorily even at a high temperature region and which can be mounted on an automobile without bend processing.

The present invention has been made to solve the above-mentioned problems, and the present invention provides a hose for fuel transportation comprising an inner layer which is a fluororesin layer having electrical conductivity and an outer layer which is a fluororesin layer having no electrical conductivity.

Further, the present invention provides a hose for fuel transportation comprising an inner layer which is a fluororesin layer having electrical conductivity and an outer layer which is a fluororesin layer having no electrical conductivity, which has a corrugated region midway.

BEST MODE FOR CARRYING OUT THE INVENTION

Now, the present invention will be described in detail.

Heretofore, a fuel hose having a multilayer structure is known wherein an inner layer of a fluororesin is used as a layer (a barrier layer) to prevent permeation of volatile hydrocarbons as a fuel component to be transported, and as an outer layer surrounding it, a polyamide resin such as nylon 6, nylon 66, nylon 610, nylon 612, nylon 11 or nylon 12, is used via an adhesive layer.

Whereas, the present invention is characterized in that a fluororesin is used not only for an inner layer but also for an outer layer. The fluororesin to be used for the inner layer and the outer layer, is not particularly limited, but is preferably one selected from ethylene/tetrafluoroethylene copolymers, tetrafluoroethylene/hexafluoropropylene copolymers and vinylidene fluoride polymers. Different resins may be selected for the inner layer and the outer layer, but it is more preferred to employ the same fluororesin taking into consideration of the fact that recycling is easy.

In the present invention, as an ethylene/tetrafluoroethylene copolymer (ETFE), one having tetrafluoroethylene (hereinafter referred to as TFE) and ethylene copolymerized in a ratio of from 70/30 to 30/70 (molar ratio) or one having these monomers and one or more other monomers such as fluoroolefins or hydrocarbon type olefins other than ethylene, such as propylene, copolymerized, is, for example, preferably used a more preferred copolymer is one having TFE/ethylene/other monomers copolymerized in a molar ratio of (65 to 35)/(20 to 60)/(0 to 40), particularly preferably (60 to 50)/(30 to 60)/(0 to 5).

As such a copolymerizable olefin, various monomers can be used including an α-olefin such as propylene or butene; a fluoroolefin having hydrogen atoms in an unsaturated group, such as vinylidene fluoride or (perfluorobutyl) ethylene; a vinyl ether such as an alkyl vinyl ether or a (fluoroalkyl)vinyl ether; and a (meth)acrylate such as a (fluoroalkyl)methacrylate or a (fluoroalkyl)acrylate. Further, together with them, a monomer having no hydrogen atom in a polymerizable unsaturated group, such as hexafluoropropylene (hereinafter referred to as HFP) or a perfluoro(alkyl vinyl ether) may be used in combination as a third monomer.

Further, in the present invention, as a TFE/HFP copolymer (hereinafter referred to as FEP), one having TFE and HFP copolymerized in a ratio of 85 to 95/5 to 15 (molar ratio), or one having these monomers and one or more fluorine-containing monomers copolymerized, is preferred. Here, as the copolymerizable fluorine-containing monomer, chlorotrifluoroethylene (hereinafter referred to as CTFE), hexafluoroisobutylene, pentafluoropropylene, trifluoroethylene, vinyl fluoride or a fluoro(alkyl vinyl ether) may be mentioned as a typical example.

In the present invention, the vinylidene fluoride polymer (PVdF) is meant to include not only usual polyvinylidene fluoride, but also a copolymer comprising at least one fluorine-containing monomer copolymerizable with vinylidene fluoride. Here, as the fluorine-containing monomer copolymerizable with vinylidene fluoride, TFE, HFP, CTFE, hexafluoroisobutylene, pentafluoropropylene, trifluoroethylene, vinyl fluoride or a fluoro(alkyl vinyl ether) may be mentioned as a typical example. The amount of vinylidene fluoride in the copolymer is preferably at least 35 mol %.

Taking into consideration the fact that the interior the engine room usually becomes 125° C. or higher, the fuel hose preferably has a continuous duty temperature higher than that, more preferably 150° C. or higher. Each of the above-mentioned fluororesins to be used in the present invention has a continuous duty temperature of 150° C. or higher.

The half-life period of the tensile elongation at break is obtained by changing the temperature in accordance with the method specified in ASTM D-3045, and then this continuous duty temperature is obtained by an extrapolation of the period to 100,000 hours.

When such a fluororesin is used as the inner layer, the fuel permeation coefficient is preferably at most 6 g·mm/m²·day.

ETFE, FEP and PVdF are preferably solid polymers at room temperature and can be used by themselves as thermoplastic resins or elastomers. They can be produced by various conventional polymerization methods such as bulk polymerization, suspension polymerization, emulsion polymerization and solution polymerization.

The above-mentioned double layer laminated structure as the basic construction of the hose of the present invention, is preferably integrated by molding. Namely, the fluororesin materials constituting the outer layer and the inner layer are molded by press molding or co-extrusion molding by utilizing heat fusion. By employing the same resin as the fluororesins for the inner and outer layers, the interlaminar bond strength in the case of integration by molding, can further be increased. The temperature condition in the case of the co-extrusion molding is at least 100° C., preferably at least the softening temperature of either the outer layer or the inner layer. By carrying out co-extrusion molding under such conditions, a hose (tube) will be produced. Further, in the case of a multilayer structure based on such a double layer structure, firstly, a tube for the innermost layer is molded by an extruder, and outer tubes are formed stepwise by an extruder on the outer surface of the innermost layer.

In the present invention, a material having electrical conductivity is incorporated to a fluororesin layer of the inner layer to make it a layer having electrical conductivity, so that the static electricity formed when the fuel flows through the tube, will be discharged and removed.

For incorporation of an electrically conductive material for such anti-static properties, it is preferred to preliminarily prepare pellets by melt mixing before carrying out formation of a tube. For such melt mixing, it is required to carry out kneading mechanically at least at a temperature where the fluororesin component will melt. For example, it is possible to employ e.g. a high temperature kneader or a screw extruder. Preferably, it is advisable to employ the same directional twin screw extruder in order to uniformly mix the electrically conductive material.

As the electrically conductive material, a powder of a metal such as copper, nickel or silver; fibers of a metal such as iron or stainless steel; carbon black, or a metallized inorganic compound having the surface of e.g. zinc oxide, glass beads or titanium oxide coated by metal sputtering or electroless plating, may be mentioned as a preferred example. Among them, carbon black is most preferred, since hydroxyl groups or carboxyl groups are present on the surface of particles, and they may improve the adhesion of the inner layer, as adhesive groups.

By dispersing the electrically conductive material in the fluororesin for an inner layer at a high concentration, it is possible to obtain a molding material having electrical conductivity.

The amount of the electrically conductive material in the layer having electrical conductivity is optionally determined depending upon e.g. the type of the fluororesin, the electrical conductivity performance of the laminate and the molding conditions, but it is usually within a range of from 1 to 30 parts by weight, particularly from 5 to 20 parts by weight, per 100 parts by weight of the resin. The volume resistivity of the layer having electrical conductivity is preferably within a range of from 1 to $10^9$ Ω·cm, preferably from $10^2$ to $10^8$ Ω·cm, for the antistatic function.

With the laminated hose in the present invention, although not particularly limited, the outer diameter of the straight portion of the laminated hose is preferably within a range of from 5 to 30 mm, and the inner diameter is preferably within a range of from 3 to 25 mm. With respect to the thicknesses of the respective tubes constituting the hose, although not particularly limited, the inner layer is preferably within a range of from 0.02 to 3.0 mm, preferably from 0.05 to 2.0 mm. On the other hand, in the case of a corrugated region of the hose, with each of the thick portion and the slender portion, the outer diameter is preferably within a range of from 5 to 30 mm, and an inner diameter is preferably within a range of from 3 to 25 mm. Further, the thicknesses of the respective tubes constituting the hose, are not particularly limited, but the inner layer is preferably from 0.02 to 3.0 mm, preferably from 0.05 to 2.0 mm.

FIG. 1 shows hose 10 according to the present invention, wherein the outer layer is represented by 11, and the inner layer is represented by 12, containing electrically conductive material 13 therein.

In the present invention, the hose is basically of a double layer structure wherein both the inner layer and the outer layer are constituted by fluororesins. However, unless the characteristics of the hose according to the present invention are impaired, the innermost layer, the outermost layer, etc., may further be provided to such a double layer structure. Namely, a fiber-reinforced layer for reinforcing the hose may, for example, be provided. Further, it may have a bonding layer made of an adhesive to strengthen the interlaminar bonding strength to prevent interlaminar peeling of the laminate. After the integration by the molding of the hose having a double layer structure constituted by a fluororesin, such an innermost layer or an outermost layer may be provided on e.g. the outer surface of the integrated molded product by such a means as an adhesive. When the innermost layer or the outermost layer is made of a fluororesin, it is preferred to employ a resin which has heat resistance and preferably has a continuous duty temperature of at least 150° C. For example, chlorinated polyether, nylon 11, nylon 12 or polyimide, may be mentioned.

To the fluororesin layers of the outer layer and the inner layer constituting the hose of the present invention, an optional component such as a thermoplastic resin, a filler such as silica, carbon, glass fiber or carbon fiber, a pigment, a plasticizer, a tackifier, a silane coupling agent or a titanate type coupling agent, may be mixed, as the case requires, within a range not to impair the performance of the laminate.

Further, in the present invention, the content of the fluororesin component based on all components of the hose material, is at least 60 wt %, preferably at least 80 wt %, more preferably at least 90 wt %, most preferably at least 95 wt %.

The hose of the present invention may have a corrugated region in midway. Such a corrugated region is a region having a waved shape, a bellows shape, an accordion shape or a corrugated shape formed at an optional region midway of the main body of the hose.

When the hose of the present invention has such a region wherein a plurality of corrugated fold lines are arranged in a ring form, at such a region, one side of the ring form can be compressed, and the other side can be outwardly extended, whereby it can be easily bent at an optional angle without bringing about stress fatigue or interlaminar peeling.

The corrugated region of the fuel hose of the present invention can easily be formed by molding a straight tube first, followed by molding in a mold to form a predetermined corrugated shape.

Further, the fuel hose of the present invention may not only be one having a corrugated region over the entire length of the hose, but it may be one having a corrugated region locally.

Further, the measurement of the fuel barrier property of e.g. a fluororesin constituting the inner layer or the outer layer of the fuel hose of the present invention, i.e. the measurement of the fuel permeation coefficient of e.g. volatile hydrocarbons, is carried out in accordance with a method specified in JIS Z-0208 at an exposure temperature of 60° C.

The antistatic performance of the fuel hose of the present invention is evaluated by the results of measuring the volume resistivity.

The volume resistivity is measured by the following method. As a sample, a tube is cut into 5 cm and further cut longitudinally. Using Loresta AP, manufactured by Mitsubishi Chemical Corporation, four probes are contacted with the inner layer surface of the sample under a load of 1 kg, whereby the volume resistivity is measured.

Effects

The hose for fuel transportation of the present invention is a hose made of a laminate wherein a fluororesin is employed for both the inner layer and the outer layer, and it has high heat resistance and excellent properties to prevent leakage of volatile hydrocarbons of the fuel at a region where the environmental atmosphere temperature is high, such as an engine. Accordingly, the amount of leakage of volatile hydrocarbons discharged from e.g. automobiles, can be reduced to the limit as compared with a case where a fluororesin as a barrier layer is used only as an inner layer. Further, in the hose of the present invention, the fluororesin layer of the inner layer is a layer having electrical conductivity, having an electrically conductive material incorporated, and thus has an adequate anti-static performance.

Further, the fuel hose of the present invention preferably has a corrugated region, whereby it can be easily mounted as bent at an optional angle depending upon the structural arrangement within the engine room, without bringing about stress fatigue or interlaminar peeling.

EXAMPLES

The present invention will described in detail with reference to Examples. However, the present invention is by no means thereby restricted. Further, in the Examples, "parts" means "parts by weight".

(1) Firstly, resin pellets to form a hose were prepared.

Reference Example 1

By suspension polymerization, ETFE of polymerized units based on ethylene/polymerized units based on TFE/polymerized units based on (perfluorobutyl)ethylene=52/46/2.0 (molar ratio), was prepared (hereinafter referred to as polymer A).

Then, polymer A was melt-kneaded by means of a single screw extruder under such conditions that the temperature was 270° C., and the retention time was three minutes, to obtain pellets 1.

Further, 100 parts of polymer A and 20 parts of carbon black (Denkablack, manufactured by Denki Kagaku Kogyo Kabushiki Kaisha) as an electrically conductive material, were preliminarily mixed and melt-kneaded by means of a same directional twin screw extruder under such conditions that the temperature was 300° C. and a retention time was 3 minutes, to obtain pellets 2.

Reference Example 2

To 100 parts of PVdF pellets 3 (KF polymer #1100, manufactured by Kureha Chemical Industry Co., Ltd.), 20 parts of carbon black (Denkablack, manufactured by Denki Kagaku Kogyo Kabushiki Kaisha) as an electrically conductive material, was preliminarily mixed, followed by melt-kneading by means of a same directional twin screw extruder under such conditions that the temperature was 240° C. and a retention time was 3 minutes, to obtain pellets 4.

Reference Example 3

To 100 parts of FEP pellets 5 (NP-30, manufactured by Daikin Industries, Ltd.), 20 parts of carbon black (Denkablack, manufactured by Denki Kagaku Kogyo Kabushiki Kaisha) as an electrically conductive material, was preliminarily mixed, followed by melt-kneading by means of a same directional twin screw extruder under such conditions that the temperature was 310° C. and a retention time was 3 minutes, to obtain pellets 6.

(2) Measurement of the fuel permeation coefficient in Examples and Comparative Examples, was carried out as follows.

① 100 ml of a mixed fuel liquid (hereinafter referred to as Fuel-C) comprising isooctane and toluene in a volume ratio of 1:1, was put into an aluminum cup having a height of 50 mm and a bottom plate of 60 mm in diameter (permeation area: 28.3 cm$^2$) (one having a threaded portion provided at an upper portion so that it can be covered with a sheet or film for the permeation tests), and the cup was covered with a material having a wire mesh overlaid on a film prepared in the following Example 1 to 3, whereupon the periphery was sealed and clamped for tight sealing.

This container was put into an explosion-proof oven upside down so that the content liquid was in contact with the film, followed by heating at 60° C., whereby the weight change was measured, and the fuel permeation coefficient-1 (g·mm/m$^2$·day) at 60° C. was calculated from the weight reduction rate when the weight reduction rate became constant.

② 85 ml of the mixed fuel liquid (Fuel-C) comprising isooctane and toluene in a volume ratio of 1:1, and 15 ml of methanol, were put (this will be hereinafter referred to as Fuel-M15), and in the same manner as described above, the container was covered with a material having a wire mesh overlaid on a film prepared in the following Example 1 to 3 and the following Comparative Example 1 or 2, and the periphery was sealed and clamped for tight sealing.

This container was put into an explosion-proof oven upside down so that the content liquid was in contact with the film, followed by heating at 60° C., whereby in the same manner as described above, the weight change was measured, and the fuel permeation coefficient-2 (g·mm/m$^2$·day) at 60° C. was calculated.

(3) In the following Examples 1 to 6 and Comparative Examples 1 to 4, hoses were formed by using the above described resin pellets.

Example 1

(i) Pellets 1 obtained in Reference Example 1 were supplied to a cylinder to form an outer layer of a tube, held in a melting zone of the cylinder at 300° C. for a retension time of two minutes and then transferred to a transportation zone of the cylinder. Likewise, pellets 2 obtained in Reference Example 1 were supplied to a cylinder to form an inner layer of a tube, held in a melting zone of the cylinder at 320° C. for a retension time of 3 minutes and then transferred to a transportation zone of the cylinder.

By setting the temperature of a co-extrusion die at 310° C., a tube made of pellets 1 and pellets 2, was prepared. A laminated hose for fuel transportation having an outer diameter of 8 mm and an inner diameter of 6 mm, wherein the thicknesses of the outer and inner layers were 0.85 mm and 0.15 mm, respectively, was obtained. The volume resistivity of an electrically conductive layer of the inner layer formed from pellets 2, was 3.2×10$^2$ Ω·cm.

(ii) Further, using pellets 1 to form the inner layer, a film 1 having a thickness of 100μ and a width of 120 mm, was molded by extrusion at a temperature of from 290 to 300° C. by an extruder having an opening diameter of 30 mm (L/D: 24). Using this film 1, a fuel permeation test was carried out.

Example 2

(i) Pellets 3 described in Reference Example 2 were supplied to a cylinder to form an outer layer of a tube, held in a melting zone of the cylinder at 240° C. for a retension time of 3 minutes and then transferred to a transportation zone of the cylinder. Likewise, pellets 4 obtained in Reference Example 2 were supplied to a cylinder to form an inner layer of a tube, held in a melting zone of the cylinder at 260° C. for a retension time of two minutes and then transferred to a transportation zone of the cylinder.

By setting the temperature of a co-extrusion die at 250° C., a tube made of pellets 3 and pellets 4, was prepared. A laminated hose for fuel transportation having an outer diameter of 8 mm and an inner diameter of 6 mm, wherein the thicknesses of the outer and inner layers were 0.80 mm and 0.20 mm, respectively, was obtained. The volume resistivity of an electrically conductive layer of the inner layer formed from pellets 4, was 2.4×10$^3$ Ω·cm.

(ii) Further, using PVdF pellets 3, a film 2 having a thickness of 100μ and a width of 120 mm, was molded by extrusion at a temperature of from 230 to 250° C. by an extruder having an opening diameter of 30 mm (L/D: 24). Using this film 2, a fuel permeation test was carried out.

Example 3

(i) FEP pellets 5 of Reference Example 3 were supplied to a cylinder to form an outer layer of a tube, held in a melting zone of the cylinder at 310° C. for a retension time of two minutes and then transferred to a transportation zone of the cylinder. Likewise, pellets 6 were supplied to a cylinder to form an inner layer of a tube, held in a melting zone of the cylinder at 330° C. for a retension time of 3 minutes and then transferred to a transportation zone of the cylinder.

By setting the temperature of a co-extrusion die at 320° C., a tube made of pellets 5 and pellets 6, was prepared. A laminated hose for fuel transportation having an outer diameter of 8 mm and an inner diameter of 6 mm, wherein the thicknesses of the outer and inner layers were 0.90 mm and 0.10 mm, respectively, was obtained. The volume resistivity of an electrically conductive layer of the inner layer formed from pellets 6, was 5.8×10$^2$ Ω·cm.

(ii) Further, using FEP pellets 5, a film 3 having a thickness of 100μ and a width of 120 mm, was molded by extrusion at a temperature of from 300 to 310° C. by an extruder having an opening diameter of 30 mm (L/D: 24). Using this film 3, a fuel permeation test was carried out.

Comparative Example 1

(i) Pellets 7 (L-2121, manufactured by Daicel-Hütls Ltd.) of nylon 12 (hereinafter sometimes referred to as PA12)

were supplied to a cylinder to form a tube. By setting the temperature in a transportation zone at a level of from 200 to 240° C., a tube of a single layer of nylon 12 was prepared at a tube-forming die temperature of 240° C. A tube for fuel transportation having an outer diameter of 8 mm and an inner diameter of 6 mm, wherein the thickness of the layer was 1.00 mm, was prepared.

(ii) Further, using pellets 7 of nylon 12, a film 4 having a thickness of 100µ and a width of 120 mm, was molded by extrusion at a temperature of from 300 to 310° C. by an extruder having an opening diameter of 30 mm (L/D: 24). Using this film 4, a fuel permeation test was carried out.

Comparative Example 2

(i) Pellets 7 (L-2121, manufactured by Daicel-Hüls Ltd.) of nylon 12 were supplied to a cylinder to form an outer layer of a tube, held in a melting zone of the cylinder at 240° C. for a retention time of 3 minutes and then transferred to a transportation zone of the cylinder. Likewise, pellets 4 obtained in Reference Example 2 were supplied to a cylinder to form an inner layer of a tube, held in a melting zone of the cylinder at 260° C. for a retension time of two minutes and then transferred to a transportation zone of the cylinder.

By setting the temperature of a co-extrusion die at 250° C., a tube comprising an outer layer made of pellets 7 of PA12 and an inner layer made of pellets 4, was prepared. A laminated hose for fuel transportation having an outer diameter of 8 mm and an inner diameter of 6 mm, wherein the thicknesses of the outer and inner layers were 0.80 mm and 0.20 mm, respectively, was obtained. The volume resistivity of an electrically conductive layer of the inner layer formed from pellets 4, was $2.4 \times 10^3$ Ω·cm.

(ii) Further, using PVdF pellets 4 having carbon black incorporated as an electrically conductive material, a film 5 having a thickness of 100µ and a width of 120 mm, was molded by extrusion at a temperature of from 230 to 250° C. by an extruder having an opening diameter of 30 mm (L/D: 24). Using this film 5, a fuel permeation test was carried out.

The results are shown in Table 1.

TABLE 1

| | Inner layer material | Outer layer material | Continuous duty temperature (° C.) | Fuel permeation coefficient-1 (g/m²·day) | Fuel permeation coefficient-2 (g/m²·day) |
| --- | --- | --- | --- | --- | --- |
| Ex. 1 | ETFE | ETFE | 165 | 1.68 | 4.6 |
| Ex. 2 | PVdF | PVdF | 150 | 2.69 | 5.9 |
| Ex. 3 | EFP | EFP | 200 | 0.52 | 2.1 |
| Comp. Ex. 1 | PA12 | PA12 | 90 | 20.6 | 142.6 |
| Comp. Ex. 2 | PVdF | PA12 | 90 | 3.50 | 6.7 |

Example 4

In the same manner as in Example 1, a tube made of pellets 1 and pellets 2, was prepared, and furhter, by a molding method by a mold, a laminated hose having a corrugated region over the entire tube, was prepared.

It was a laminated hose for fuel transportation wherein the thicknesses of the outer and inner layers at thick portions of the corrugated region of this hose were 0.7 mm and 0.1 mm respectively, the outer diameter was 11 mm and the inner diameter was 9.4 mm, and the thicknesses of the outer and inner layers at slender portions were 0.85 mm and 0.15 mm, respectively, the outer diameter was 8 mm and the inner diameter was 6 mm.

Example 5

In the same manner as in Example 2, a tube made of pellets 3 and pellets 4, was prepared, and furhter, by a molding method by a mold, a laminated hose having a corrugated region over the entire tube, was prepared.

It was a laminated hose for fuel transportation wherein the thicknesses of the outer and inner layers at thick portions of the corrugated region of this hose were 0.7 mm and 0.1 mm respectively, the outer diameter was 11 mm and the inner diameter was 9.4 mm, and the thicknesses of the outer and inner layers at slender portions were 0.85 mm and 0.15 mm, respectively, the outer diameter was 8 mm and the inner diameter was 6 mm.

Example 6

In the same manner as in Example 3, a tube made of pellets 5 and pellets 6, was prepared, and furhter, by a molding method by a mold, a laminated hose having a corrugated region over the entire tube, was prepared.

It was a laminated hose for fuel transportation wherein the thicknesses of the outer and inner layers at thick portions of the corrugated region of this hose were 0.7 mm and 0.1 mm respectively, the outer diameter was 11 mm and the inner diameter was 9.4 mm, and the thicknesses of the outer and inner layers at slender portions were 0.85 mm and 0.15 mm, respectively, the outer diameter was 8 mm and the inner diameter was 6 mm.

Comparative Example 3

In the same manner as in Comparative Example 1, a tube made of pellets 7 was prepared, and furhter, by a molding method by a mold, a hose of PA12 single layer having a corrugated region over the entire tube, was prepared.

A single layered hose for fuel transportation was obtained wherein the thickness at thick portions of the corrugated region of this hose was 0.8 mm, the outer diameter was 11 mm and the inner diameter was 9.4 mm, and the thickness at slender portions was 1 mm, the outer diameter was 8 mm and the inner diameter was 6 mm.

Comparative Example 4

In the same manner as in Comparative Example 2, a tube comprising an outer layer made of nylon 12 pellets 7 and an inner layer made of pellets 4, was prepared, and furhter, by a molding method by a mold, a laminated hose having a corrugated region over the entire tube, was prepared.

A laminated hose for fuel transportation was obtained wherein the thickness at thick portions of the corrugated region of this hose was 0.8 mm, the outer diameter was 11 mm and the inner diameter was 9.4 mm, and the thickness at slender portions of the corrugated region was 1 mm, the outer diameter was 8 mm and the inner diameter was 6 mm.

(4) With respect to the hoses thus obtained in Examples 1 to 6 and Comparative Examples 1 to 4, the fuel permeability was measured as follows.

Namely, from each of the above hoses, five hoses of 60 cm were cut out and used as samples of the hose for measuring the fuel permeability. To each sample, Fuel-C or Fuel-M15, as a mixed fuel, was sealed in, and both ends were tightly sealed.

Firstly, for each case, five hose samples having the Fuel-C fuel sealed in, were prepared, and their weights were measured. Then, they were left to stand for 150 hours in a constant temperature oven maintained at 60° C., whereby the weight changes were measured. From the weight change of each hose between before and after being left, the fuel permeability-1 per unit outer surface area of the hose (g/m²·day) was calculated. The fuel permeability was represented by an average value of the five hoses.

Then, replacing Fuel-C by Fuel M15, similar measurements were carried out, and the fuel permeability-2

($g/m^2 \cdot day$) was calculated. However, in this case, the samples were left at 60° C. for 70 hours.

The obtained fuel permeabilities show the amounts of fuels actually permeating through both the inner and outer layers of the hose. The results are summarized in Tables 2 and 3.

TABLE 2

| | Inner layer material | Outer layer material | Continuous duty temperature (° C.) | Fuel permeation coefficient-1 ($g/m^2 \cdot day$) | Fuel permeation coefficient-2 ($g/m^2 \cdot day$) |
|---|---|---|---|---|---|
| Ex. 1 | ETFE | ETFE | 165 | 0.001> | 0.01> |
| Ex. 2 | PVdF | PVdF | 150 | 0.001> | 0.01> |
| Ex. 3 | EFP | EFP | 200 | 0.001> | 0.01> |
| Comp. Ex. 1 | PA12 | PA12 | 90 | 18.8 | 160.6 |
| Comp. Ex. 2 | PVdF | PA12 | 90 | 1.42 | 5.54 |

TABLE 3

| | Inner layer material | Outer layer material | Continuous duty temperature (° C.) | Fuel permeation coefficient-1 ($g/m^2 \cdot day$) | Fuel permeation coefficient-2 ($g/m^2 \cdot day$) |
|---|---|---|---|---|---|
| Ex. 4 | ETFE | ETFE | 165 | 0.001> | 0.01> |
| Ex. 5 | PVdF | PVdF | 150 | 0.001> | 0.01> |
| Ex. 6 | EFP | EFP | 200 | 0.001> | 0.01> |
| Comp. Ex. 3 | PA12 | PA12 | 90 | 21.5 | 180.3 |
| Comp. Ex. 4 | PVdF | PA12 | 90 | 1.66 | 7.24 |

INDUSTRIAL APPLICABILITY

The hose for fuel transportation of the present invention is a fuel hose wherein a fluororesin having high heat resistance and being excellent in prevention of leakage of volatile hydrocarbons at a high temperature, such as ETFE, FEP or PVdF, is used for each of the inner layer and the outer layer. Accordingly, as compared with a case where only an inner layer is a fluororesin layer, permeation and leakage of volatile hydrocarbons can be prevented far effectively, even at a high temperature region of environmental atmosphere, such as an engine room of an automobile, and it is thereby possible to meet strict environmental regulations. Further, the fluororesin layer of the inner layer is an electrically conductive layer and thus has a sufficient antistatic property.

Furthermore, the fuel hose of the present invention preferably has a corrugated region, whereby it can be mounted as bent at an optional angle depending upon the structural arrangement within an engine room without bringing about stress fatigue or interlaminar peeling and without requiring bend processing. Further, it is evident also from Examples that even when a corrugated region is formed, the fuel permeability is not impaired at all.

What is claimed is:

1. A hose for fuel transportation comprising:
   an inner layer which is a fluororesin layer having electrical conductivity and comprising a fluororesin selected from the group consisting of ethylene/tetrafluoroethylene copolymer, ethylene/tetrafluoroethylene/(perfluorobutyl)ethylene copolymer, and mixtures thereof; and
   an outer layer which is a fluororesin layer having no electrical conductivity and comprising a fluororesin selected from the group consisting of ethylene/tetrafluoroethylene copolymer, ethylene/tetrafluoroethylene/(perfluorobutyl)ethylene copolymer, and mixtures thereof;
   wherein the fluororesin layer in the inner layer includes a material having electrical conductivity, which material comprises carbon black;
   wherein said outer layer is the outermost layer of said hose, and
   wherein the fluororesin in at least one of the layers is ethylene/tetrafluoroethylene/(perfluorobutyl)ethylene copolymer.

2. The hose for fuel transportation according to claim 1, wherein the hose has a corrugated region midway.

3. The hose according to claim 1, wherein the fluororesin layers in the inner and outer layers are integrated by molding.

4. The hose according to claim 1, wherein the volume resistivity of the fluororesin layer having electrical conductivity is from 1 to $10^9$ Ω·cm.

5. The hose according to claim 1, wherein the fluororesin layers in the inner and outer layers comprise a fluororesin having a continuous duty temperature of at least 150° C.

6. The hose according to claim 1, wherein the fuel permeability coefficient of the fluororesin layers in the inner and outer layers is at most 6 $g \cdot mm/m^2 \cdot day$.

7. The hose according to claim 1, wherein the content of the fluororesin layers in the inner and outer layers relative to the hose is at least 60 wt %.

8. The hose according to claim 1, wherein the fluororesin layer in the inner layer comprises the at least one material having electrical conductivity in a range of 1 and 30 parts by weight per 100 parts by weight of fluororesin therein.

9. The hose according to claim 8, wherein the fluororesin layer in the inner layer comprises the at least one material having electrical conductivity in a range of 5 and 20 parts by weight per 100 parts by weight of fluororesin therein.

10. The hose according to claim 1, wherein the fluororesin layers in the inner and outer layers comprise the same fluororesin.

11. A hose for fuel transportation comprising:
    an inner layer which is a fluororesin layer having electrical conductivity and comprising a fluororesin selected from the group consisting of ethylene/tetrafluoroethylene copolymer, ethylene/tetrafluoroethylene/(perfluorobutyl)ethylene copolymer, and mixtures thereof; and
    an outer layer which is a fluororesin layer having no electrical conductivity and comprising a fluororesin selected from the group consisting of ethylene/tetrafluoroethylene copolymer, ethylene/tetrafluoroethylene/(perfluorobutyl)ethylene copolymer, and mixtures thereof;
    wherein the fluororesin layer in the inner layer includes a material having electrical conductivity, which material comprises carbon black;
    wherein said outer layer has a thickness of at least 0.7 mm, and
    wherein the fluororesin in at least one of the layers is ethylene/tetrafluoroethylene/(perfluorobutyl)ethylene copolymer.

12. The hose for fuel transportation according to claim 11, wherein the hose has a corrugated region midway.

* * * * *